US011727828B2

(12) United States Patent
Mosier et al.

(10) Patent No.: US 11,727,828 B2
(45) Date of Patent: Aug. 15, 2023

(54) VIRTUAL REALITY ENVIRONMENT ADAPTED TO MODEL THE MAMMALIAN AIRWAY FOR INTUBATION AND AIRWAY MANAGEMENT TRAINING

(71) Applicant: ARIZONA BOARD OF REGENTS ON BEHALF OF THE UNIVERSITY OF ARIZONA, Tucson, AZ (US)

(72) Inventors: Jarrod Mosier, Tucson, AZ (US); Young-Jun Son, Tucson, AZ (US); David E. Biffar, Tucson, AZ (US); Vignesh Subbain, Tucson, AZ (US); Saurabh Jain, Tucson, AZ (US); Bijoy Dripta Barua Chowdhury, Tucson, AZ (US); Thomas Cahir, Tucson, AZ (US); Eze Ahanonu, Tucson, AZ (US)

(73) Assignee: Arizona Board of Regents on Behalf of The University of Arizona, Tucson, AZ (US)

(*) Notice: Subject to any disclaimer, the term of this patent is extended or adjusted under 35 U.S.C. 154(b) by 271 days.

(21) Appl. No.: 17/179,673

(22) Filed: Feb. 19, 2021

(65) Prior Publication Data
US 2021/0256875 A1   Aug. 19, 2021

Related U.S. Application Data

(60) Provisional application No. 62/978,732, filed on Feb. 19, 2020.

(51) Int. Cl.
*G09B 23/30* (2006.01)
*G09B 9/00* (2006.01)
(Continued)

(52) U.S. Cl.
CPC .......... *G09B 23/30* (2013.01); *B29C 33/3842* (2013.01); *B29C 64/393* (2017.08);
(Continued)

(58) Field of Classification Search
CPC ...... G09B 23/28; G09B 23/285; G09B 23/30; G09B 9/00; B33Y 50/02; B33Y 80/00;
(Continued)

(56) References Cited

U.S. PATENT DOCUMENTS

| 2012/0280988 A1* | 11/2012 | Lampotang | .......... G09B 23/285 |
| | | | 434/262 |
| 2013/0323700 A1* | 12/2013 | Samosky | .............. G09B 23/30 |
| | | | 434/262 |
| 2017/0372640 A1* | 12/2017 | Lampotang | .............. G09B 9/00 |

* cited by examiner

*Primary Examiner* — Timothy A Musselman
(74) *Attorney, Agent, or Firm* — Cozen O'Connor

(57) ABSTRACT

A training system uses a physical model of a head and neck with a first tracker, a second tracker on a physical laryngoscope model, a third tracker on a physical endotracheal tube model, and a fourth tracker on a VR goggle; the system uses the trackers to determine positions of the physical models. A simulation system has corresponding digital 3D models of a laryngoscope, an endotracheal tube, and an airway, the airway including 3D models of surfaces of tongue, epiglottis, larynx, pharynx, and trachea. The physical model locations are registered to the digital models. In embodiments, the physical laryngoscope model has sensors measure strain or pressure along its blade and the simulation system has instructions to distort the digital 3D model of the airway according to readings of the sensors. The system can render the digital 3D model viewed from the VR goggle or a camera of the laryngoscope.

17 Claims, 5 Drawing Sheets

(51) Int. Cl.
    *G06T 19/20*       (2011.01)
    *G06T 15/20*       (2011.01)
    *B33Y 50/02*       (2015.01)
    *B29C 64/393*     (2017.01)
    *B29C 33/38*      (2006.01)
    *B33Y 80/00*      (2015.01)
    *B29L 31/00*      (2006.01)

(52) U.S. Cl.
    CPC ............... *B33Y 50/02* (2014.12); *B33Y 80/00* (2014.12); *G06T 15/20* (2013.01); *G06T 19/20* (2013.01); *G09B 9/00* (2013.01); *B29L 2031/753* (2013.01); *G06T 2210/41* (2013.01); *G06T 2219/2021* (2013.01)

(58) Field of Classification Search
    CPC ... B29C 64/393; B29C 33/3842; G06T 15/20; G06T 19/20; G06T 2210/41; G06T 2219/2021; B29L 2031/753
    See application file for complete search history.

FIG. 3
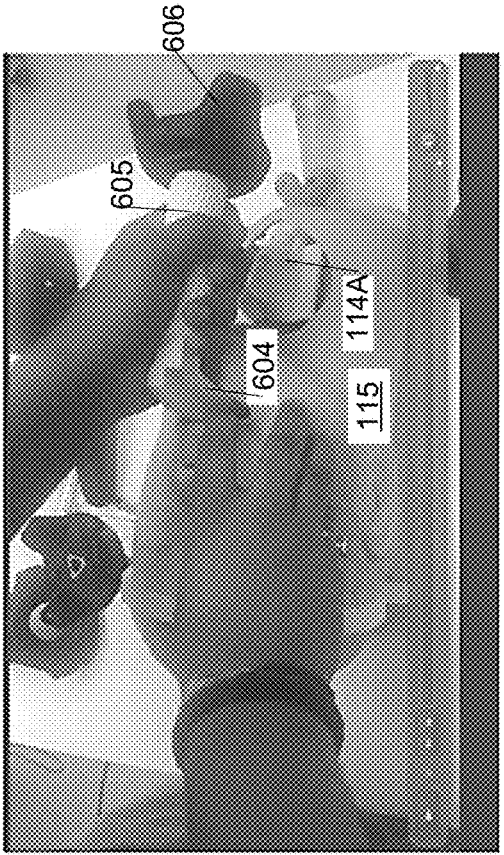
FIG. 4
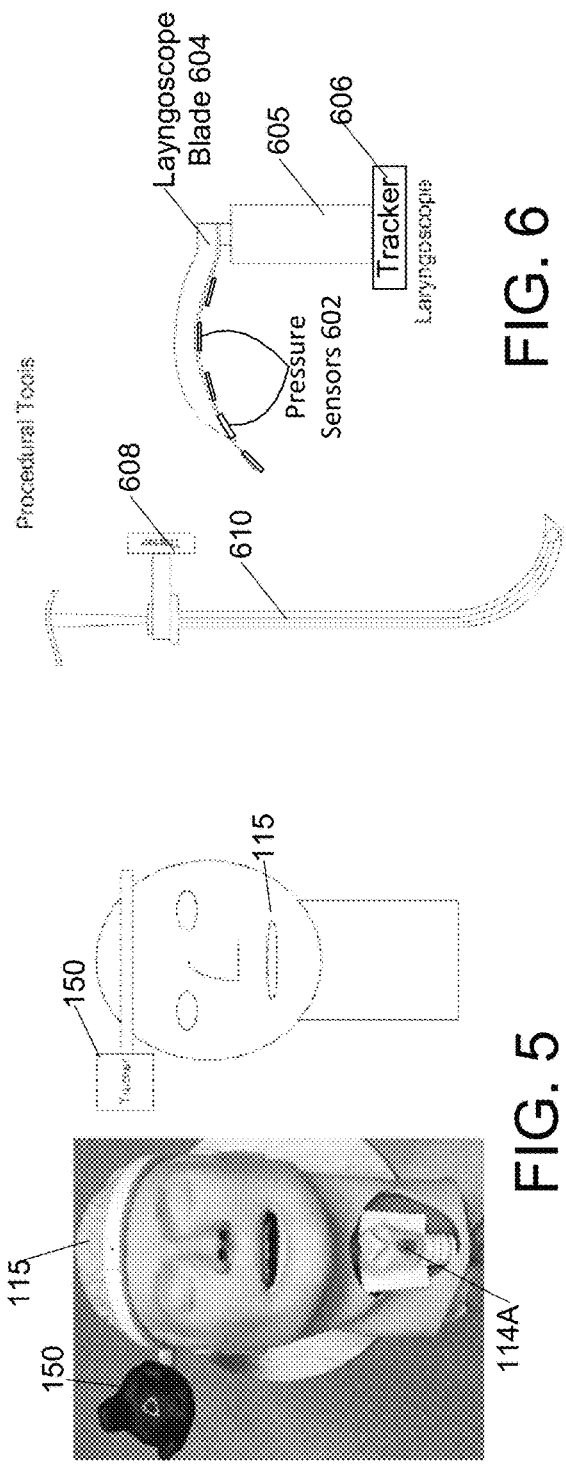
FIG. 5
FIG. 6

VIRTUAL REALITY ENVIRONMENT ADAPTED TO MODEL THE MAMMALIAN AIRWAY FOR INTUBATION AND AIRWAY MANAGEMENT TRAINING

PRIORITY CLAIM

The present document claims priority to U.S. Provisional Patent Application 62/978,732 filed 19 Feb. 2020. The entire contents of that provisional application are incorporated herein by reference.

BACKGROUND

Land mammals, including humans, typically breathe through an airway that includes their nasal cavity and mouth, throat, larynx, trachea, and bronchi. Failure to maintain airflow through this airway can result in death.

Tracheal intubation—insertion of an endotracheal tube through mouth or nose into the trachea through which air flows to and from the lungs—is commonly done when most mammals are anesthetized because in many unconscious mammals (including humans) the fully relaxed tongue may fall into and block the airway, preventing ventilation. Further, such an endotracheal tube is a convenient path for administering medications such as anesthetic gases, and such tubes may be used with mechanical ventilation. Intubation is commonly performed in hospital emergency departments (ED) and intensive care units (ICU) for critically ill patients with respiratory failure, including many with severe pneumonia, acute respiratory distress syndrome (ARDS) which may also result from viral infections such as SARS or COVID-19 (SARS-CoV-2 infection). Tracheal intubation is also often performed in both human and animal surgical suites during induction of anesthesia.

Tracheal intubation during induction of anesthesia may be performed immediately after administering drugs through an intravenous line that sedate and/or paralyze a subject, thus improper intubation or excessive delay in intubation can prove fatal to the subject who can no longer breathe for themselves.

At times, tracheal intubation may be difficult, for example swollen throat lining from an anaphylactic reaction, swelling or bleeding from injuries, or vomitus in the airway may make it difficult to intubate quickly and properly. Incorrectly intubating a subject, for example inserting the tube into the esophagus instead of the trachea or introduction of vomitus from throat into trachea, can cause injury or death to the subject. Further, the more attempts it takes to correctly place the tube, the greater the risk of complications to the subject including swelling or lacerations of lining of throat, larynx, and trachea that may make it even more difficult to intubate the subject.

Laryngoscopes and similar devices are required to aid visualization of the airway and allow insertion of endotracheal tubes into the airway.

Airway management in the ED and ICU patient population is particularly high risk, because of multiple factors (human, patient, and task related) that increase the danger. During tracheal intubation, a first end of a malleable plastic endotracheal tube is placed in the patient or subject's airway, whereupon a second end of the endotracheal tube is then often connected to a mechanical ventilator or anesthesia machine. Placing these tubes is typically done by using a laryngoscope blade to compress the tongue and soft tissues of the upper airway to allow visualization of the airway structures for correctly placing the tube. As the tongue and upper airway structures are highly innervated, this requires administering potent medications (such as propofol with rocuronium or succinylcholine) that render the patient unconscious, apneic, and fully muscle relaxed.

A risk with this procedure has traditionally been vomiting and passive regurgitation of gastric contents into the lungs. Many critically-ill patients are intubated for conditions that render them at risk of rapid blood oxygen desaturation if intubation is not completed quickly and accurately, which increases the risk of cardiopulmonary arrest that has been reported in as many as 1 in 40 patients; the risk of arrest is increased by up to seven times this rate if intubation is not performed properly on the first attempt; patients requiring three attempts are very likely to have complications.

It is therefore advisable to train medical personnel in proper intubation techniques.

The threats to safety with tracheal intubation have historically involved anatomic obstacles to visualization of the glottis and thus interfering with placement of an endotracheal tube under direct visual observation. By extension, tracheal intubation was safest when performed by those highly skilled with laryngoscopy. High-fidelity simulation manikins were developed to provide anatomically accurate representations of the upper airway with certain modifications that can be employed to increase commonly encountered sources of difficulty: tongue swelling, pharyngeal edema, laryngeal spasm, and cervical immobility. Training with direct laryngoscopy on these high-fidelity manikins improved skill acquisition by medical personnel and, presumably, improved patient outcomes.

In modern airway managements video laryngoscopes may visualize the larynx without requiring a direct line of sight, amongst other technological developments. These video laryngoscopes have reduced the incidence of difficulty and steepened the learning curve for skill acquisition. The residual risk of harm from intubating anatomically difficult airways comes partly from the providers failure to identify and prepare for potential difficulties, and to recognize the need to move to a second plan when faced with difficulty.

A source of patient related risk to the safety of airway management today are physiological disturbances that increase risk of cardiopulmonary decompensation with intubation. These physiological disturbances vary widely, but include hypoxemia, hemodynamic instability, right ventricular failure, and severe metabolic acidosis. The severity of these disturbances directly correlate to the speed in which decompensation occurs, particularly with hypoxemia and desaturation. Thus, the risk of physiological disturbance increases as the time duration from administration of medications to completion of intubation and connection to the mechanical ventilator increases.

These two factors, laryngoscopes designed to overcome anatomic obstacles and physiological disturbances increasing the danger of intubation, highlight a gap in ability to recreate these circumstances in a simulated environment.

Current methods for teaching intubation techniques lack variety and realistic features, such as training where there is a limited view available, failure to provide accurate haptic (touch) feedback, and failure to accurately recreate the stressed environment when faced with a rapidly decompensating (worsening) patient.

SUMMARY

In an embodiment, a training system has a first tracker mounted to a physical model of a head and neck, the physical model of the head and neck comprising hard plastic components and soft plastic components mounted to the hard-plastic components, the hard-plastic components including physical models of skull, teeth, larynx, tracheal cartilage and jaw, the soft components including physical models of tongue, epiglottis, pharynx lining, and esophagus; a second tracker mounted to a physical model of a laryngoscope; and a third tracker mounted to a physical model of an endotracheal tube. The system also includes a display device; a tracking and mechanical sensing system configured to track a location, an orientation, velocity and acceleration of the first, second, and third tracker and to determine relative positions of the model of the laryngoscope, the physical model of the endotracheal tube, and the physical model of the head and neck; and a simulation system coupled to the tracking and mechanical sensing system, the simulation system comprising at least one processor and a memory, the memory comprising digital three-dimensional (3D) models of a laryngoscope, an endotracheal tube, and an airway, the airway further comprising 3D models of surfaces of tongue, epiglottis, larynx, pharynx, and trachea. In this embodiment, the digital 3D models of surfaces of tongue, epiglottis, larynx, pharynx, and trachea corresponding to the physical models of tongue, epiglottis, pharynx lining, and trachea.

In another embodiment, a method of constructing a training system for training medical personnel in intubation procedures includes preparing digital three-dimensional (3D) computer-aided-design (CAD) models of a laryngoscope, an endotracheal tube, and an airway, the CAD model of the airway further comprising 3D models of surfaces of tongue, epiglottis, larynx, pharynx, and trachea; preparing a physical head model comprising hard components and soft components mounted to the hard components, the hard components including a model of skull, teeth, larynx, tracheal cartilage and jaw, the soft components including a model of tongue, epiglottis, pharynx lining, and esophagus, the physical head model modeling the airway; instrumenting a physical model of the laryngoscope with a tracker; instrumenting a physical model of the endotracheal tube with a tracker; instrumenting 3D goggles with a tracker; and registering the CAD model of the airway to airway of the physical head model. The method also includes rendering images of the airway and endotracheal tube as seen from either the 3D goggles or a simulated camera attached to the laryngoscope from the CAD models of the airway laryngoscope, and endotracheal tube; displaying the images of the airway and endotracheal tube on the 3D goggles.

In another embodiment, a physical laryngoscope model has a laryngoscope model body; a tracker attached to the laryngoscope model body and adapted to be tracked in three dimensions by tracking receivers; a laryngoscope model blade attached to the laryngoscope model body; a plurality of sensors attached to the laryngoscope model blade and configured to measure pressure or laryngoscope blade deformation applied to a surface of the laryngoscope model blade; and a digital radio transmitter adapted to report readings of the plurality of sensors. In particular embodiments, the physical laryngoscope model is used in a training system also including an endotracheal tube model body having a tracker attached to the endotracheal tube model body and adapted to be tracked in three dimensions by the tracking receivers. In particular embodiments, the training system also includes a physical head model with a first tracker mounted to hard plastic components; and soft plastic components mounted to the hard-plastic components; where the hard-plastic components include a model of skull, teeth, larynx, tracheal cartilage and jaw, and the soft plastic components include a physical model of tongue, epiglottis, pharynx lining, and esophagus. In some particular embodiments, the training system also includes a simulation system coupled to the tracking receivers, the simulation system including at least one processor and a memory, the memory having recorded therein digital three-dimensional (3D) models of a laryngoscope, an endotracheal tube, and an airway, the airway further comprising three-dimensional models of surfaces of tongue, epiglottis, larynx, pharynx, and trachea; the digital 3D models of surfaces of tongue, epiglottis, larynx, pharynx, and trachea corresponding to surfaces of the hard-plastic components and the soft plastic components of the physical head model; the simulation system uses a location and orientation of the tracker on the physical laryngoscope model, the tracker on the physical endotracheal tube model, and the tracker on the physical head model to register digital three-dimensional models of a laryngoscope, an endotracheal tube, and an airway to locations of the physical model of the laryngoscope, and the physical model of the endotracheal tube, and the physical model of the head and neck, and machine-readable instructions configured to render images of the digital three-dimensional models of the laryngoscope, endotracheal tube, and the airway.

BRIEF DESCRIPTION OF THE FIGURES

FIG. 3 is a photograph of a trainee's hands manipulating a laryngoscope

FIG. 4 is a screen capture of a simulated operating room environment including a simulated video laryngoscope screen on an arm displaying an image captured by a simulated laryngoscope-mounted camera, and a simulated display of physiological parameters.

FIG. 5 is a depiction of the physical head model.

FIG. 6 is an illustration of an endotracheal tube and laryngoscope.

DETAILED DESCRIPTION OF THE EMBODIMENTS

A system is described that includes a virtual reality (VR)/augmented reality (AR) simulation system to train medical personnel, including medical and veterinary students, on how to properly perform a tracheal intubation. The system includes haptic feedback for a realistic feel along with a virtual simulation environment to induce typical scenarios that would occur during intubation. These environments can better simulate events such as loss of airway visualization during intubation due to complications such as vomiting or passive regurgitation by the patient, or rapid blood oxygen desaturation and cardiovascular collapse in the face of difficult visualization of the airway structures.

Devices (laryngoscopes and endoscopes), preoxygenation strategies, and simulation curricula have been developed to increase the safety of this procedure from these technical, physiological, and human factors contributors to risk. For example, our curriculum has led to a 92% first attempt success rate and a reduction in complications. As this work progresses, the need to improve our simulation capabilities to teach and study the decision-making involved with tracheal intubation, particularly in failed first attempts, so we can continue to improve this procedure without jeopardizing patient safety. Current high-fidelity simulation capabilities such as mannequins, have limitations in terms of realism, standardized views, and inability to create realistic dynamic scenarios without the significant need to "suspend reality". To address this need, we propose to develop novel, virtual and augmented reality technology that is theory-driven (e.g., extended Belief-Desire-Intention framework) and combined with hands-on, physics-based haptic feedback simulation capabilities to both teach airway management and study crisis decision making with this procedure.

Figure 1:
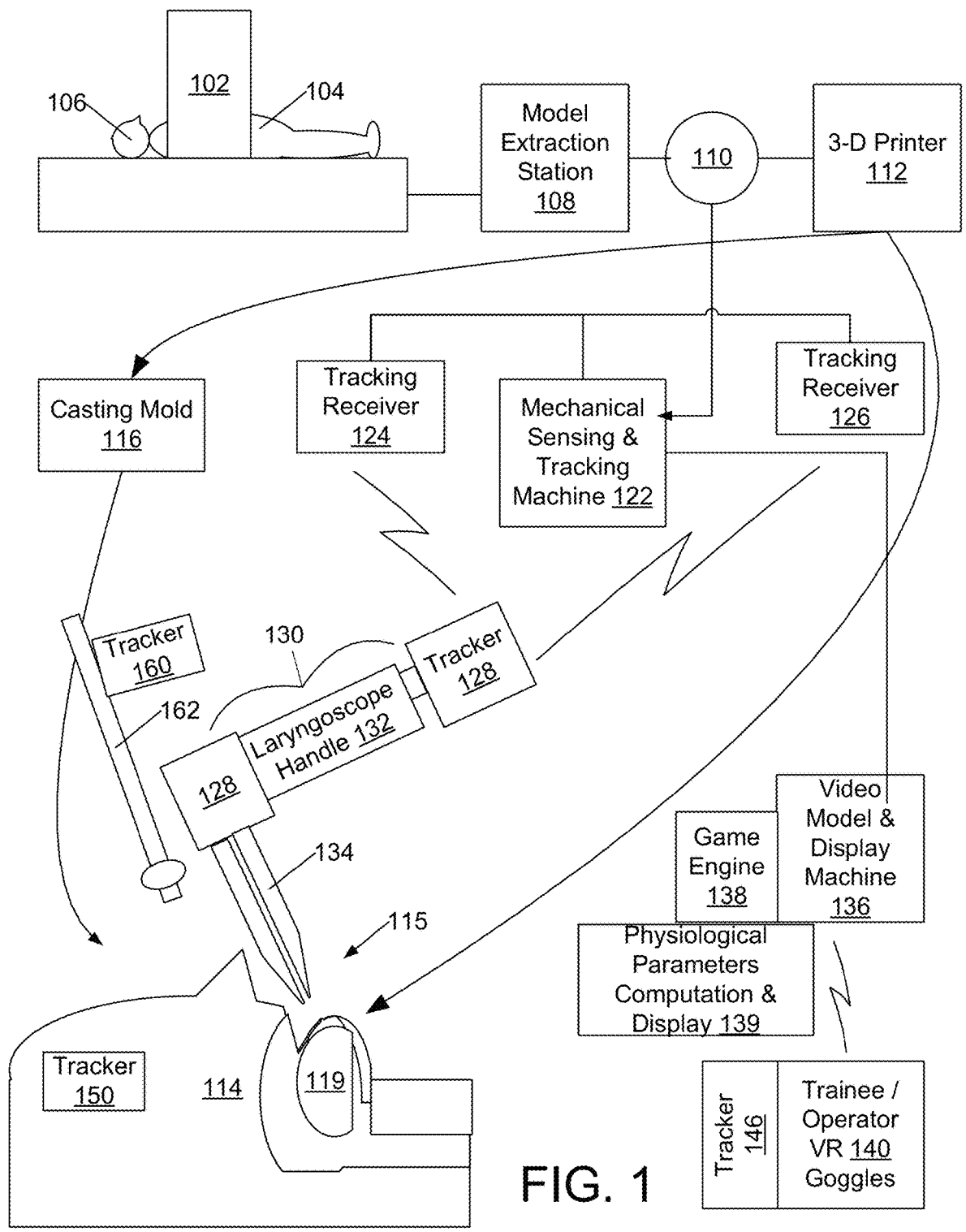
FIG. 1 is a block diagram of the simulation system.
Figure 2:
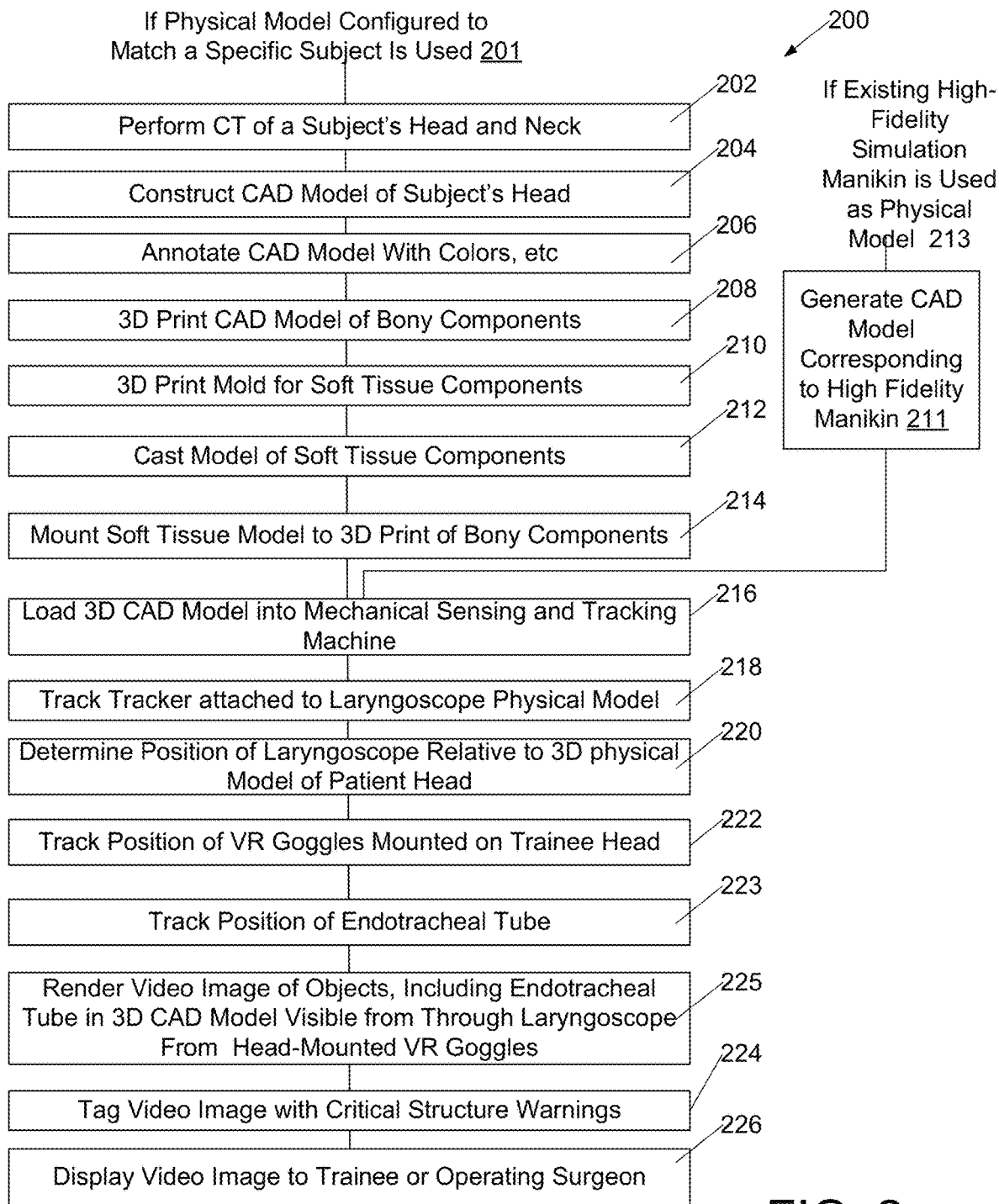
FIG. 2 is a flowchart of operation of the simulation system

In an embodiment, a method 200 (FIG. 2) of training or preparation for particular surgical cases begins with performing a computed tomography (CT) scan 202 using a CT scanner 102 (FIG. 1) to obtain three-dimensional radiographic imaging of the head 106 of a patient 104 in tomographic image stack form; in a particular embodiment the three-dimensional radiographic imaging of the head 106 includes a stack of tomographic slice images with 0.625-millimeter slices however other resolutions may be used. In an alternative embodiment, magnetic resonance imaging (MM) is used in place of CT scanner 102 to image the head and provide a similar stack of tomographic image slices, the stack of tomographic image slices being three-dimensional radiographic imaging.

In embodiments, the CT scan or MM three-dimensional radiographic imaging is, in succession, a CT scan or MM of a training series of increasing difficulty; with this series a trainee can have a series of VR and physical head models to learn by practicing basic, moderate, and difficult intubations.

The three-dimensional radiographic imaging for a selected head is used to construct 204, on a model extraction workstation 108, a three-dimensional computer-aided design (CAD) head model 110 representing the head 106 and neck of patient 104, the CAD model 110 includes in separate files a mesh model of the hard-bony structures of skull and jaw, with larynx and tracheal cartilage rings, and a mesh model of soft tissue structures including mucosa as well as tongue, epiglottis, and pharynx lining. In an embodiment, after importing the three dimensional radiographic image stack into a voxel-based 3D model, the hard bony structures and soft tissue, including mucosa, are initially automatically segmented, being distinguished from each other based at least in part on voxel intensity, initial segmentation is based on voxel intensity; CT typically shows greater X-ray absorption for calcified bony tissue than for soft tissue, while MRI images typically show less hydrogen for calcified bony tissue than for soft tissue, yet more hydrogen than for voids. Extracted or segmented imaged bony, mucosal, and soft tissue 3D voxel models are processed into mesh models of bony, mucosal, and soft tissue structure; mesh model boundaries generated with any inconsistencies (or holes) in the mesh models are repaired to form CAD head model 110.

Our training device uses a realistic physical head model. In one particular embodiment 213 (FIG. 2), an existing high-fidelity manikin is used as a physical head model. In this embodiment, a 3D CAD model is derived 211 from the high-fidelity manikin, the manikin, laryngoscope, and endotracheal tube are instrumented with trackers, and the method continues with loading 216 the 3D CAD model into the mechanical sensing and tracking machine.

In an alternative embodiment, intended to replicate anatomy of individual subjects where intubation was particularly difficult (such as those with pharyngeal tumors or injuries), the physical head model is derived from CT and/or MRI scans of one or more difficult subjects.

Segmentation of bony tissues in the CT and/or MRI voxel-based models into a bony tissue voxel model in an embodiment is done using a region growing method and threshold process, whereas for soft tissue and mucosa voxel models, a semi-automatic region growing method is used; FastGrowCut and the segmentation module in 3D Slicer functions are used for segmentation methods. Skin, muscle, and other soft tissues are segmented from mucosal tissues based upon anatomic landmarks. A marching-cube surface-mesh reconstruction is then performed on the voxel models to prepare a mesh model of each of the hard bony, mucosal, and soft tissues. Manual modification of the threshold and algorithm parameters on a regional basis may be done to avoid over-segmentation, under-segmentation and other artifacts, which may occur with volume averaging of bony and soft tissue densities in the head and neck.

The hard-bony tissue mesh model, mucosal tissue mesh model, and soft tissue mesh models from FastGrowCut are then repaired, first with a surface toolbox mesh-repair module of 3D slicer (http://www.slicer.org), and further with Autodesk 3ds Max to reduce the number of vertices for mesh optimization, and to prepare the model for 3D printing. In a particular embodiment, a Laplacian smoothing routine was used to revise mesh models to improve the approximation of curvature without losing volume. The generated and repaired mesh models of hard bony tissue, soft tissue, and mucosal tissue form parts of CAD head model 110 and are exportable in mesh form for use in 3D printers.

Extracting and segmenting imaged bony and soft tissues of the difficult subjects into 3D mesh models is performed.

In embodiments, CAD head model 110 is annotated 206 with color information. Tagging may be in part manual and in embodiments may be in part automated using a classifier based on an appropriate machine-learning algorithm. Structures are identified based upon known anatomic landmarks visible in the three-dimensional radiological imaging.

The pharynx of most mammals, including humans, has structures of differing mechanical properties that affect haptic feedback as a laryngoscope and endotracheal tube are inserted, such as hard bone, cartilage that is softer than bone, muscle, skin, and mucosal tissues. Our physical model represents these differing mechanical properties with model parts formed of at least two, and in embodiments three, different plastics including a hard plastic, a plastic of intermediate flexibility, and a soft plastic.

Figure 1A:
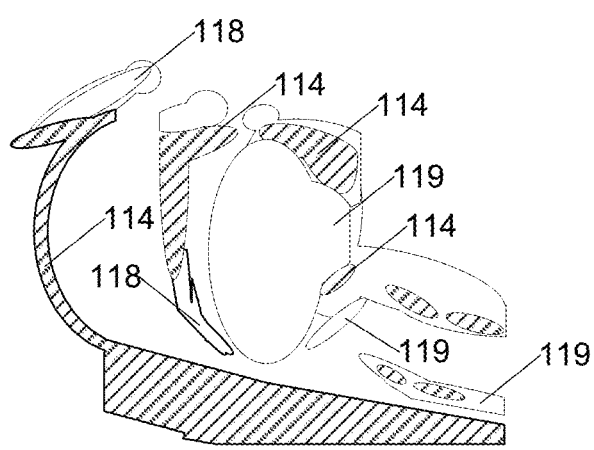
FIG. 1A is a cross sectional drawing of a portion of a physical head model, showing portions formed in hard, medium, and soft plastic.

The bony structures of CAD head model 110, and some firmer cartilage structures, are replicated 208 on a 3D printer 112 to prepare a hard-plastic physical model 114 of those hard-bony structures, including teeth, skull, jaw, larynx, and thyroid cartilage. FIG. 1A illustrates that the hard-plastic physical model includes hard palate, hyoid, jaw, teeth, roof of the nasal cavity, and spine. In particular embodiments, the larynx and thyroid cartilage are printed as a separate, removable, portion 114A (FIG. 3, 5) that is attached to remaining portions of the hard-plastic physical model 114.

3D printer 112 is also used to prepare 210, by 3D printing, a casting mold 116 configured for casting 212 a soft plastic model 118 (FIG. 1A) of selected soft tissue structures, including skin and septal cartilage of nose, as described in CAD head model 110. In an embodiment, a mold is directly printed. In some embodiments soft plastic model 118 is formed of a soft silicone plastic, alternative embodiments, other physically soft plastics are substituted for silicone in soft plastic model 118. In an alternative embodiment, a rigid model of the selected soft tissue structures is printed, this being then used as a form to cast a flexible silicone mold that is in turn used to cast soft plastic model 118 of soft tissue structures including tongue, epiglottis, tracheal lining, and pharynx lining. In an alternative embodiment, soft plastic model 118 is directly printed using a flexible UV-polymerizable resin in an SLA 3D printer such as the Formlabs Form2™ (trademark of Formlabs, Somerville, Mass.) printer.

3D printer 112 is also used to prepare 211 a casting mold configured for casting 212 a soft plastic model 119 of selected mucosal structures, including the epiglottis, pharynx lining, and tongue. Once cast 212, the soft plastic mucosal model 119 is mounted 215 to the hard-plastic bony tissue physical model 114.

Once the soft plastic soft-tissue model 118 of soft tissue structures is cast 212 and mounted, and after mounting 215 the soft plastic mucosal model 119 to the hard-plastic bony tissue model, to create the head physical model 115, the head physical model 115 includes hard plastic physical model 114 having hard plastic components representing bony structures, soft plastic model 119 of mucosal structures, and soft plastic model 118 having soft plastic components representing soft tissue structures. The head physical model is then instrumented by attaching trackers to it so its position and orientation can be tracked by tracking receivers.

Figure 7:
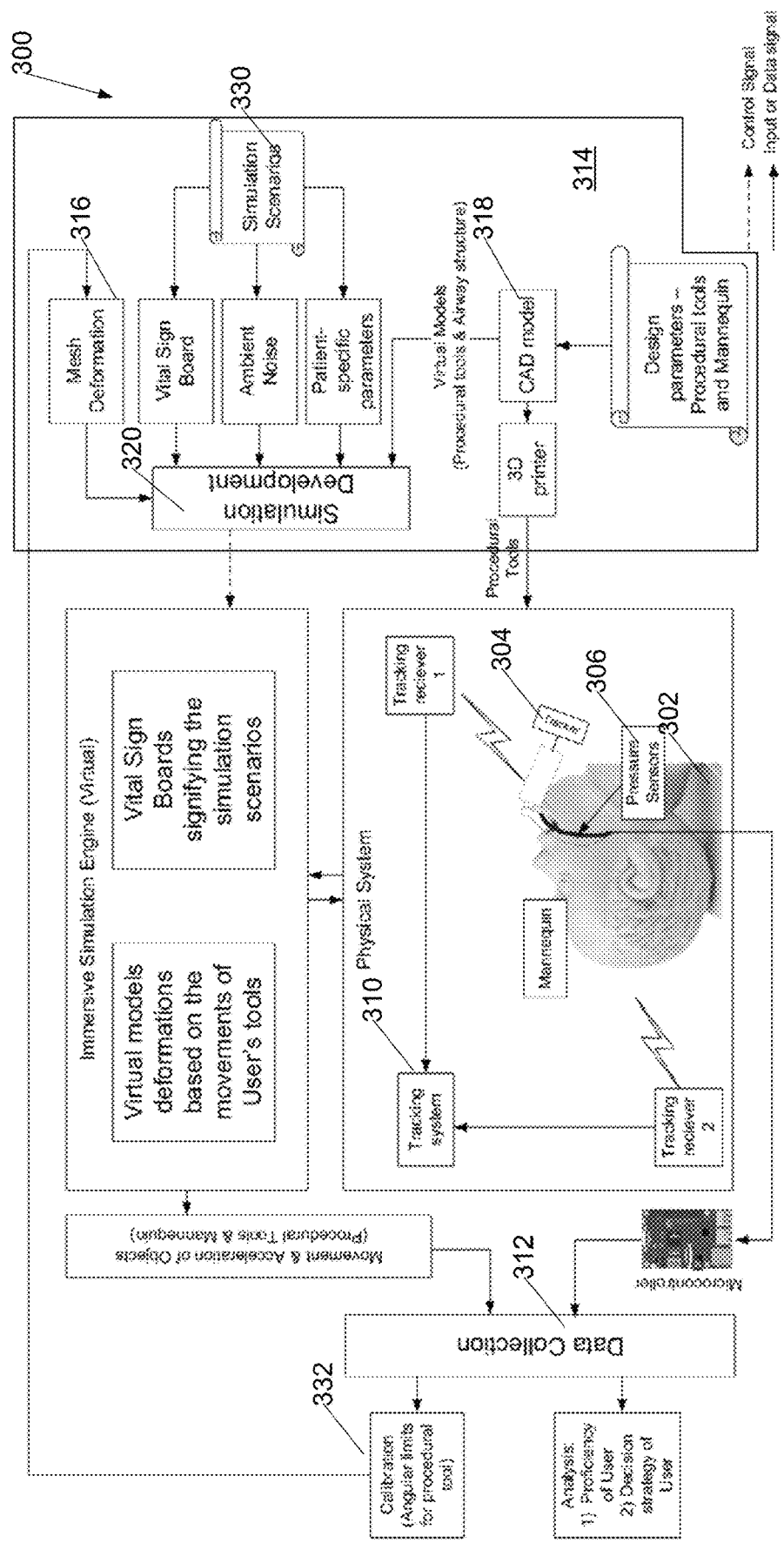
FIG. 7 is a block diagram of an embodiment of a simulation system.

The model laryngoscope 605 (FIGS. 3 and 6) and endotracheal tube 610 are instrumented with trackers 160, 128 (FIGS. 1 and 2), 606, 608 (FIG. 6) so that their position and orientation can be tracked by tracking receivers. In embodiments, the blade of the model laryngoscope is also instrumented with multiple sensors 602 distributed along blade 604. In a particular embodiment, the model laryngoscope is instrumented with five pressure sensors 602 distributed along blade 604 to measure a pressure profile of points along the blade 604 that may contact the head physical model 115 during attempted intubations by trainees. In some embodiments, the model laryngoscope 605 is also equipped with a battery and a digital radio transmitter, such as but not limited to a Bluetooth transmitter, adapted to wirelessly transmit the pressure profile including readings from the multiple sensors 602 to a mechanical sensing and tracking machine 122 or data collection system 312 (FIG. 7). The physical laryngoscope model is shown having its blade inserted through a mouth opening of a physical head model by a trainee in FIG. 3.

The laryngoscope model is also instrumented with sensors distributed along the blade and an attached tracker, and the physical head model is instrumented with an attached tracker.

The 3D CAD head model 110 is loaded 216 into a mechanical sensing and tracking machine 122 equipped with tracking receivers 124, 126. Tracking receivers 124, 126 are configured to track 218 location and orientation in three-dimensional space of a tracker 128 that is attached to a model laryngoscope 130, in a particular embodiment, tracking receivers 124, 126 and tracker 128 are HTC Vive (HTC, New Taipei City, Taiwan) trackers and the virtual reality goggles are an HTC Vive Pro headset and are equipped with another tracker 146; in other embodiments other virtual reality goggles, tracking receivers, and trackers may be used. In an embodiment, head physical model 115 is at a known location, in other embodiments, physical head model 115 is attached to another tracker 150 through a short metal rod. Also attached to laryngoscope 132 is a tracker 128. A tracker 160 is also attached to a physical model endotracheal tube 162.

The mechanical sensing and tracking machine 122 determines locations and orientations of the tracker 128 on the laryngoscope, and the tracker 150 attached to physical head model 115, and uses the location and orientation of the tracker 128 on the laryngoscope 132 to determine 220 a location and orientation of the physical model laryngoscope's blade 134 in the head physical model, and determine 223 a location and orientation of the physical endotracheal tube in the head physical model. The head physical model is in turn aligned and registered by machine readable instructions in memory of a sensing and tracking machine 122 executing on a processor of modeling and tracking machine 122 to a virtual head as modeled by CAD head model 110 executing on sensing and tracking machine 122, the CAD head model 110 being derived from the 3D image stack determined from MM and/or CT scans. Since the head physical model 115 is first calibrated 332 for size, angles, and location, and registered to the CAD head model 110, and each location of model laryngoscope head 134 in the head physical model corresponds to a location in the CAD head model 110, the sensing and tracking machine 122 can track 222 virtual reality goggles and determine relative positions of the physical models of the laryngoscope, physical head model, physical endotracheal tube model, and virtual reality goggles 140, and can align respective virtual CAD models accordingly so that, when CAD models of the laryngoscope, head model, and endotracheal tube are rendered and displayed 226, they are shown in the same relative positions as the physical models of the laryngoscope, head, and endotracheal tube.

The CAD head model is automatically deformed by the modeling and tracking machine 122 machine based upon presence of the laryngoscope's blade that is presumed unable to penetrate the surface mesh. The 3D model is adjusted by preferentially deforming soft tissue components of the 3D CAD head model in preference to hard tissue components of the model, although in embodiments the jaw angle of the hard parts of the CAD head model is allowed to change. In a particular embodiment, deformation of the soft parts of the CAD head model is modeled with an elastic modeling procedure considering pressure as monitored by pressure sensors on the physical model laryngoscope's blade as well as deformation of the soft parts of the CAD model to avoid penetration of the laryngoscope blade beneath the 3D CAD model surface.

In a particular embodiment, upon rendering 225 the head model, critical structures may be tagged 224 in images to help the trainee realize where these critical structures are.

In addition, tracker 160 is attached to an endotracheal tube 162 for tracking the endotracheal tube. The mechanical sensing and tracking machine 122 uses the location and orientation of the tracker 160 to determine a location of a tip of the endotracheal tube relative to the model laryngoscope and head model.

Mechanical interaction of the physical models of laryngoscope and endotracheal tube with the head physical model as the physical model laryngoscope and endotracheal tube, and optionally a suction tube, are inserted into the physical head model provides tactile or haptic feedback to a trainee manipulating the physical model laryngoscope and endotracheal tube that resembles tactile or haptic feedback as a physician or trainee inserts a real laryngoscope and endotracheal tube into a patient's real mouth and airway.

Once relative locations of physical head model, endotracheal tube, laryngoscope, and VR goggles 140 are determined, video model and display machine 136, using game engine 138, renders 225 images of a simulated operating room, ED, or ICU environment including a patient's head and body, the digital three-dimensional models of surfaces of tongue, epiglottis, larynx, pharynx, and trachea, as well as the digital three-dimensional models of the laryngoscope, and endotracheal tube are rendered as they would be seen from the VR goggles and displayed on the VR goggles. In an alternative embodiment, the simulated operating room environment includes a simulated monitor on which images of CAD head model surfaces, including the digital three-dimensional models of surfaces of tongue, epiglottis, larynx, pharynx, and trachea and endotracheal tube surfaces, are rendered as seen by a simulated camera mounted on the laryngoscope and displayed on a virtual video laryngoscope screen in a field of view of the VR goggles. In an alternative embodiment, images of CAD head model surfaces including the digital three-dimensional models of surfaces of tongue, epiglottis, larynx, pharynx, and trachea and endotracheal tube surfaces are rendered as seen by a simulated camera mounted on the laryngoscope and displayed on a monitor adjacent to the physical head model. In these embodiments, the CAD head model surfaces, including the digital three-dimensional models of surfaces of tongue, epiglottis, larynx, pharynx, trachea and endotracheal tube surfaces are distorted according to tracked position and pressures measured by the sensors disposed along the physical laryngoscope model's blade.

In an embodiment, in addition to performing rendering, game engine 138 and video model and display machine 136 provides 139 simulated physiological data to simulated physical and/or virtual physiological data display devices such as simulated cardiac monitors and oxygen saturation monitors. The simulated physiological data may include simulated heart rate and simulated blood oxygen saturation, blood pressure, end-tidal CO2 such as may deteriorate should intubation take overlong, or should the esophagus be intubated instead of the trachea, to provide additional realism and difficult training scenarios to a trainee. In embodiments, the rate and degree of change of physiological data and the introduction of ambient environmental noise can be used to induce psychological stress in the trainee.

In an alternative embodiment, no VR goggles are used, however a monitor resembling monitors used with existing video laryngoscopes is provided in view of the trainee. In this alternative embodiment, game engine 138 constructs images as seen by a simulated camera mounted on the laryngoscope of endotracheal tube and CAD head model surfaces and presents these images on the monitor. In an embodiment 300 (FIG. 7) of the system, a physical head model 302 is equipped with a tracker (not shown) and a laryngoscope with tracker 304 attached is used by a trainee to insert an endotracheal tube. The laryngoscope has a set of sensors 306 configured to measure forces applied through the laryngoscope to displace the tongue and other soft tissues. In an embodiment, the sensors (306) are strain-gauges, in an alternative embodiment the sensors are pressure sensors. In yet another embodiment, the pressure sensors include a diaphragm coupled to the blade through an elastomer or spring configured for the diaphragm to displace under pressure combined with an encoder, such as an optical encoder, configured to quantify and encode displacement of the diaphragm. In a particular embodiment, the pressure sensors 602 of the laryngoscope model couple to the data acquisition system 312 wirelessly. Tracking system 310 determines location, orientation, and relative velocity and acceleration of trackers, and thus of the attached head model and laryngoscope. Tracking system 310 and laryngoscope sensor feed head model and laryngoscope location, orientation, and velocity and acceleration information and laryngoscope-blade sensor information to data acquisition system 312 which feeds video model and display machine 314 that has a 3D CAD model 318 corresponding initially to the physical head model. In embodiments having VR goggles, the tracking system 310 also feeds VR goggle location and orientation information to data acquisition system 312. The 3D CAD model is automatically deformed 316 by a processor of video modeling and display machine 136 executing machine readable instructions in memory of the video modeling and display machine 136 based upon physical presence of the physical model of the laryngoscope's blade that is presumed unable to penetrate the surface mesh of the 3D CAD model of the airway. The 3D model is adjusted by preferentially deforming soft tissue components of the CAD model in preference to hard tissue components of the model, although jaw angles are allowed to change. The deformed CAD model, together with models of laryngoscope and an endotracheal tube (not shown) are used in simulation environment 320, together with assorted scenarios, such as introduction of vomitus into the airway, to provide an immersive visual simulation through VR goggles.

In embodiments, the visual simulation of the endotracheal tube and tissues as provided through the VR goggles is adjusted in accordance with training simulation scenarios 330 to represent problems that may arise during intubation to permit trainees to learn how to cope with problems that may arise in practice. Such training simulation scenarios may include, but are not limited to, regurgitation of vomitus into the pharynx at the larynx leaving vomitus in the airway, presence of a foreign object or foreign material in the pharynx, blood in the airway from bleeding into the area from pre-existing injury or presumed injury derived from excessive pressures detected on the sensors of the physical laryngoscope model's blade, altered or unusual airway anatomy, rapid physiological decompensation and similar issues. In addition to adjusting the visual simulation by, for example flooding the field of view of simulated videolaryngoscope display 404 with blood and/or vomit, a display 402 (FIG. 4) of simulated physiological parameters, such as but not limited to pulse rate, blood oxygen saturation, and blood pressure, may be adjusted in accordance with the training simulation scenarios. To add further realism to training simulation scenarios for paramedics and flight nurses, playing audio of additional recorded sounds, such as helicopter rotor noises, battle sounds such as gunfire and shell detonations, and audio of screaming parents, and yelling aircrew or coworkers, may be played to induce stress in and disrupt concentration of a trainee.

While many trainees are medical professional trainees that expect to intubate humans, the present system is also applicable to veterinary medicine trainees. To provide realism for veterinary medicine trainees, physical head models and 3D CAD models may be constructed for a variety of species, such as horses, goats, cats, and dogs, of varying sizes and anatomy; trainees may then practice intubation on a variety of these models. For example, a small animal veterinarian trainee may practice intubation on physical models with associated 3D CAD models of domestic cats as well as small, medium, large, and brachiocephalic dogs.

Creating physiological difficulty in prior high-fidelity manikins without our system is inadequate because modern laryngoscopes allow the trainee to rapidly intubate. To inject stress from physiological disturbances, unusual anatomy, and simulated stressful environments to force the learner to make a different decision on prior manikins requires unrealistic scenarios. This ultimately leads to reinforcing suboptimal decision making and an inability to understand or study decision making under stress.

Mixed reality methods as herein described present a potential solution to these limitations.

In a particular embodiment, as the position, orientation, velocity and acceleration of the physical laryngoscope model's blade in the head model is tracked and determined to be in particular critical positions, particular pre-recorded sounds—such as gunfire—are played while location, orientation, velocity or acceleration or pressure changes are sensed by the tracking system and sensors on the physical laryngoscope model's blade and monitored to determine if the trainee jerks the laryngoscope or makes other undesired movements in response to the sounds; jerking or other undesired movements are quantified for later review by the trainee and an instructor. If the trainee jerks the laryngoscope or makes other undesired movements in response to the sounds that exceed a threshold, video as provided to the monitor or VR goggles is modified to represent appropriate tissue deformation, a resultant superficial injury, and/or more severe tissue tears and bleeding; in a particular embodiment the video is modified by introducing a tissue tear and simulated blood into the visual field, thereby providing immediate visual feedback to the trainee. Other typical trainee responses to other typical external trainee stress stimuli not listed here are included in each embodiment described herein and those described are not suggestive of any limitation.

In our system, an anatomically accurate physical manikin, which may be generated from CT and MRI scans of a real, difficult-to-intubate, patient such as one with abnormal anatomy, recreate in a submersible clinical environment allowing for variable manipulation of the anatomic characteristics of the airway that are seen by the video laryngoscope and felt by the operator to create circumstances where the learner must troubleshoot under stress. It also allows for the ability to simulate soil, such as vomitus, in the airway. Real-time pressure feedback from the laryngoscope, combined with position as measured by the trackers, is used to realistically determine the degree of soft tissue displacement leading to a realistic view obtained by the simulated video laryngoscope, which is seen through the VR lens. Additionally, the physiological disturbances can be more realistically represented and situational stressors can be injected into the scenario to create distress, which can be measured through biometrics of the operator. Entire sessions, including biometrics of the trainee, applied stressors, video as of the laryngoscope, and the view as seen in the virtual reality goggles, is recorded for replay, study, and discussion with instructors. This can be utilized to better train learners, refine advanced skills for experienced learners, and study human factors related to airway management under stress.

Our anatomically accurate physical manikins recreated in a submersible clinical environment allows for variable manipulation of the anatomic characteristics of the airway that are seen by the video laryngoscope and felt by the operator to create circumstances where the learner must troubleshoot under stress. They also allow for the ability to simulate soil in the airway. Real-time pressure feedback from the laryngoscope can be used to realistically determine the degree of soft tissue displacement leading to a realistic view seen through the virtual reality lens simulating a view obtained through a video laryngoscope. Additionally, the physiological disturbances can be more realistically represented and situational stressors can be injected into the scenario to create distress, which can be measured through biometrics of the operator. This can be utilized to better train learners, refine advanced skills for experienced learners, and study human factors related to airway management under stress.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A training system comprising:
    a first tracker mounted to a physical model of a head and neck, the physical model of the head and neck comprising hard plastic components and soft plastic components mounted to the hard-plastic components, the hard-plastic components including physical models of skull, teeth, larynx, tracheal cartilage and jaw, the soft components including physical models of tongue, epiglottis, pharynx lining, and esophagus;
    a second tracker mounted to a physical model of a laryngoscope;
    a third tracker mounted to a physical model of an endotracheal tube;
    a display device;
    a tracking and mechanical sensing system configured to track a location, an orientation, velocity and acceleration of the first, second, and third tracker and to determine relative positions of the model of the laryngoscope, the physical model of the endotracheal tube, and the physical model of the head and neck; and
    a simulation system coupled to the tracking and mechanical sensing system, the simulation system comprising at least one processor and a memory, the memory comprising digital three-dimensional (3D) models of a laryngoscope, an endotracheal tube, and an airway, the airway further comprising 3D models of surfaces of tongue, epiglottis, larynx, pharynx, and trachea;
    where the digital 3D models of surfaces of tongue, epiglottis, larynx, pharynx, and trachea corresponding to the physical models of tongue, epiglottis, pharynx lining, and trachea.

2. The training system of claim 1, the memory further comprising machine readable instructions configured to use the location and orientation of the first, second, and third tracker to register the digital 3D models of the laryngoscope, endotracheal tube, and the airway to locations of the physical model of the laryngoscope, and the physical model of the endotracheal tube, and the physical model of the head and neck, and to render images of the digital 3D models of the laryngoscope, endotracheal tube, and the airway.

3. The training system of claim 1 wherein the laryngoscope is instrumented with a plurality of sensors adapted to measure strain or pressure disposed along a blade of the physical laryngoscope model.

4. The training system of claim 3 wherein the memory comprises machine readable instructions configured to distort the digital 3D model of the airway according to readings of the sensors disposed along the blade of the physical laryngoscope model.

5. The training system of claim 3 wherein the memory comprises machine readable instructions to render images of the digital 3D model of the airway as viewed from a simulated camera on a blade of the digital laryngoscope model.

6. The training system of claim 1 wherein the display device is a head-mountable virtual reality goggle equipped with a fourth tracker, and wherein the tracking and mechanical sensing system is further configured to track location and orientation of the virtual reality goggles.

7. The training system of claim 6 wherein the physical model of a head and neck is configured to represent a human head and neck.

8. A method of constructing a training system for training medical personnel in intubation procedures comprising:
preparing digital three-dimensional (3D) computer-aided-design (CAD) models of a laryngoscope, an endotracheal tube, and an airway, the CAD model of the airway further comprising 3D models of surfaces of tongue, epiglottis, larynx, pharynx, and trachea;
preparing a physical head model comprising hard components and soft components mounted to the hard components, the hard components including a model of skull, teeth, larynx, tracheal cartilage and jaw, the soft components including a model of tongue, epiglottis, pharynx lining, and esophagus, the physical head model modeling the airway;
instrumenting a physical model of the laryngoscope with a tracker;
instrumenting a physical model of the endotracheal tube with a tracker;
instrumenting 3D goggles with a tracker;
registering the CAD model of the airway to airway of the physical head model;
rendering images of the airway and endotracheal tube as seen from either the 3D goggles or a simulated camera attached to the laryngoscope from the CAD models of the airway laryngoscope, and endotracheal tube;
displaying the images of the airway and endotracheal tube on the 3D goggles.

9. The method of claim 8 further comprising adapting the virtual reality images of the airway and endotracheal tube with visual simulations of foreign material in the airway, the foreign material selected from the group consisting of vomitus, blood, and foreign objects.

10. The method of claim 8 further comprising:
playing audio intended to disrupt concentration of a trainee;
and monitoring sensors disposed on a blade of the physical model of the laryngoscope and adapting the virtual reality images of the airway and endotracheal tube with simulated injury induced by undesired movement of a trainee in response to the played audio.

11. The method of claim 8 wherein the physical head model is configured to represent a human head and neck.

12. The method of claim 8 wherein the physical head model is configured to represent a head and neck of a dog.

13. A physical laryngoscope model comprising:
a laryngoscope model body;
a tracker attached to the laryngoscope model body and adapted to be tracked in three dimensions by tracking receivers;
a laryngoscope model blade attached to the laryngoscope model body;
a plurality of sensors attached to the laryngoscope model blade and configured to measure pressure or laryngoscope blade deformation applied to a surface of the laryngoscope model blade;
a digital radio transmitter adapted to report readings of the plurality of sensors.

14. A physical training system comprising the physical laryngoscope model of claim 13 and further comprising a physical endotracheal tube model comprising:
an endotracheal tube model body; and
a tracker attached to the endotracheal tube model body and adapted to be tracked in three dimensions by the tracking receivers.

15. The physical training system of claim 14 and further comprising:
a physical head model comprising:
a first tracker mounted to hard plastic components; and
soft plastic components mounted to the hard-plastic components;
where the hard-plastic components include a model of skull, teeth, larynx, tracheal cartilage and jaw, and the soft plastic components include a physical model of tongue, epiglottis, pharynx lining, and esophagus.

16. A training system comprising the physical training system of claim 14 and further comprising a simulation system coupled to the tracking receivers, the simulation system comprising at least one processor and a memory, the memory comprising digital three-dimensional (3D) models of a laryngoscope, an endotracheal tube, and an airway, the airway further comprising three-dimensional models of surfaces of tongue, epiglottis, larynx, pharynx, and trachea;
the digital 3D models of surfaces of tongue, epiglottis, larynx, pharynx, and trachea corresponding to surfaces of the hard-plastic components and the soft plastic components of the physical head model.

17. The training system of claim 16 further comprising:
machine readable instructions configured to use a location and orientation of the tracker on the physical laryngoscope model, the tracker on the physical endotracheal tube model, and the tracker on the physical head model to register digital three-dimensional models of a laryngoscope, an endotracheal tube, and an airway to locations of the physical model of the laryngoscope, and the physical model of the endotracheal tube, and the physical model of the head and neck,
and machine-readable instructions configured to render images of the digital three-dimensional models of the laryngoscope, endotracheal tube, and the airway.

* * * * *